W. J. BEACH.
VELOCIPEDE.
APPLICATION FILED NOV. 18, 1916.
1,222,354. Patented Apr. 10, 1917.
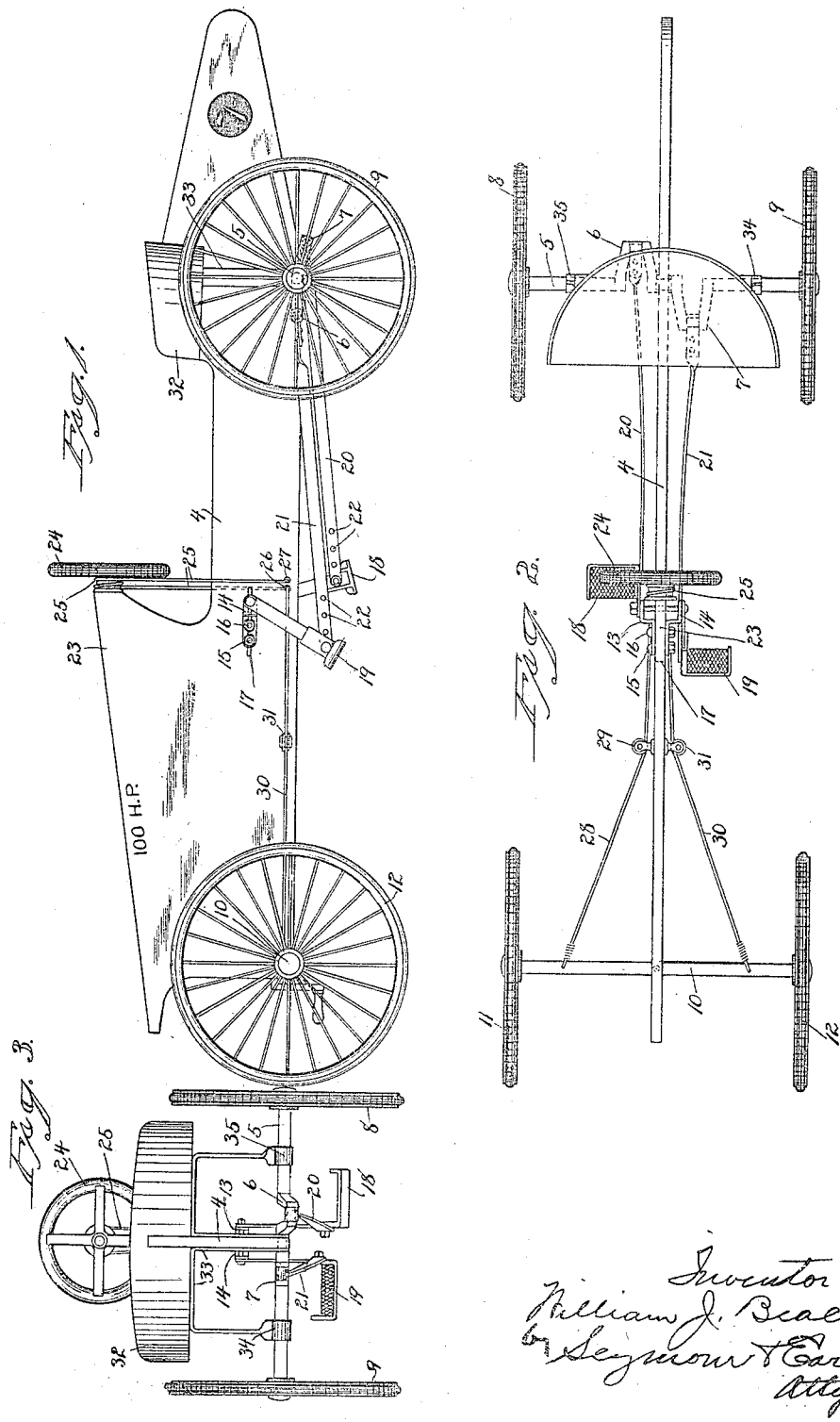

UNITED STATES PATENT OFFICE.

WILLIAM JOHN BEACH, OF NEW HAVEN, CONNECTICUT, ASSIGNOR TO THE BEACH MANUFACTURING CO., OF NEW HAVEN, CONNECTICUT, A CORPORATION.

VELOCIPEDE.

1,222,354.     Specification of Letters Patent.     Patented Apr. 10, 1917.

Application filed November 18, 1916. Serial No. 132,010.

*To all whom it may concern:*

Be it known that I, WILLIAM J. BEACH, a subject of the King of Great Britain, residing at New Haven, in the county of New Haven and State of Connecticut, have invented a new and useful Improvement in Velocipedes; and I do hereby declare the following, when taken in connection with the accompanying drawings and the characters of reference marked thereon, to be a full, clear, and exact description of the same, and which said drawings constitute part of this application, and represent, in—

Figure 1 a side view of a velocipede constructed in accordance with my invention.

Fig. 2 a top or plan view of the same.

Fig. 3 a rear view.

This invention relates to an improvement in velocipedes, and particularly to velocipedes of the four-wheel foot-driven type, the object being to construct a velocipede for children which will simulate the appearance of an automobile steered through a wheel and provided with pedals which may be adjusted to suit the length of the legs of the operator; and the invention consists in certain details of construction as will be hereinafter described and particularly recited in the claims.

In carrying out my invention, I employ a frame 4 which is formed from a strip of wood or other suitable material comparatively thin and cut in the profile of the body of an automobile. This body has a bearing upon the center of a rear axle 5 between cranks 6 and 7, and to which axle rear wheels 8 and 9 are connected in the usual manner. The cranks 6 and 7 instead of projecting from the axle 5 in line with each other, are preferably arranged slightly out of line so as to prevent them from coming to a dead center in line with the thrust of the feet. The forward end of the body is pivotally connected to a front axle 10 on which is mounted front wheels 11 and 12. On opposite sides of the body are brackets 13 and 14 secured by bolts 15 and 16 which pass through a longitudinal slot 17 in the body, and by which the brackets may be adjustably connected with the body. Pivotally connected with these brackets and depending therefrom, are pedals 18 and 19, and these pedals are respectively connected with the cranks 6 and 7 by pitmen 20 and 21, and preferably these pitmen will have a series of holes 22 to provide for the adjustment of the pedals to correspond with the adjustment of the brackets 13 and 14. Mounted on an upper projection 23 of the body which simulates in appearance the rear of the hood or dash of an automobile, is a steering wheel 24 connected to the hub of which is a cord or cable 25, the ends of which extend down on opposite sides of the body through holes 26 and 27; one end 28 passing an idler roller 29 is connected with the axle 10 near one end thereof. The other end 30 of the cord passing a roller 31 is connected with the axle 10 near the opposite end thereof, and so that by turning the wheel 24 the axle 10 will be turned accordingly. The seat 32 is attached to the rear part of the body over the rear axle 5 and is braced by a yoke 33 the ends 34 and 35 of which extend down and rest upon the rear axle.

The velocipede is operated in the usual way by a child sitting in the seat 32 and operating the pedals 18 and 19 to turn the cranks on the rear axle 5; and as above noted the position of the pedals may be adjusted to correspond to the length of the legs of the child. The front axle is turned to steer the velocipede by turning the wheel 24 which moves the ends of the cords 28 and 30 in one direction or the other to turn the front axle. I thus provide at a very low cost of manufacture, a velocipede which, owing to the formation of the body in the profile of an automobile gives the same effect in side view as a case-body, and the body may be readily formed from wood. I thus provide a very light vehicle, yet one sufficiently strong to stand the ordinary strain to which such vehicles are subjected.

I claim:—

1. A four wheeled vehicle comprising a profile body of thin material, said body mounted upon front and rear axles, and means for imparting motion to one of said axles.

2. A four wheeled vehicle having a profile body of thin material, front and rear axles upon which said body is mounted, the rear axle provided with cranks, pedals mounted on the said body, and pitmen connecting said pedals with said cranks.

3. A four wheeled vehicle having a profile body of thin material, front and rear axles upon which said body is mounted, a rear axle provided with cranks, said body formed with a longitudinal slot, brackets on opposite sides of the body and connected to the body through said slot, pedals connected with the said brackets and depending from opposite sides of the body, and pitmen, adjustably connected with said pedals and with said cranks.

4. A four-wheeled vehicle comprising a profile body of thin material, front and rear axles on which said body is mounted, the rear axle formed with cranks, pedals mounted on the said body, pitmen connecting said pedals with said cranks, the front axle pivotally connected with the body, a steering wheel mounted on the body, and a cord connecting with said wheel, the ends of the cord extending through the body in opposite directions and into engagement with the opposite ends of the front axle, whereby by turning the wheel the said front axle may be turned.

5. A four wheeled vehicle having a profile body of thin material, a front axle to which the body is pivotally connected, a rear axle on the center of which the rear of the body bears, the said rear axle formed with two cranks, pedals mounted on said body, and pitmen connecting the said pedals with the said cranks.

In testimony whereof, I have signed this specification in the presence of two subscribing witnesses.

WILLIAM JOHN BEACH.

Witnesses:
   FREDERIC C. EARLE,
   C. L. WEED.

Copies of this patent may be obtained for five cents each, by addressing the "Commissioner of Patents, Washington, D. C."